(12) United States Patent
Wang et al.

(10) Patent No.: US 11,412,538 B2
(45) Date of Patent: Aug. 9, 2022

(54) USER DEVICE, NETWORK NODE AND METHODS THEREOF

(71) Applicant: Huawei Technologies Co., Ltd., Shenzhen (CN)

(72) Inventors: Fan Wang, Shanghai (CN); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/054,706

(22) Filed: Aug. 3, 2018

(65) Prior Publication Data

US 2018/0343669 A1    Nov. 29, 2018

Related U.S. Application Data

(63) Continuation of application No. PCT/EP2016/052443, filed on Feb. 5, 2016.

(51) Int. Cl.
*H04W 72/14* (2009.01)
*H04W 74/08* (2009.01)
(Continued)

(52) U.S. Cl.
CPC .......... *H04W 72/14* (2013.01); *H04W 16/14* (2013.01); *H04W 72/0413* (2013.01);
(Continued)

(58) Field of Classification Search
None
See application file for complete search history.

(56) References Cited

U.S. PATENT DOCUMENTS

2011/0158191 A1  6/2011  Zhang et al.
2013/0322352 A1* 12/2013  Han .................... H04W 72/042
                                                   370/329
(Continued)

FOREIGN PATENT DOCUMENTS

CN   201336732 Y   10/2009
CN   101873644 A   10/2010

OTHER PUBLICATIONS

"CCA measurement to support frequency reuse",3GPP TSG RAN WG1 Meeting #82,Beijing, China, R1-154343, 3rd Generation Partnership Project, Valbonne, France (Aug. 24-28, 2015).
(Continued)

*Primary Examiner* — Nicholas Sloms
(74) *Attorney, Agent, or Firm* — Leydig, Voit & Mayer, Ltd.

(57) ABSTRACT

A user device and a network node for a wireless communication system are provided. The user device configured to receive a transmission grant indicating a set of frequency resources assigned for transmission to a network node; configured to determine a channel access outcome based on a channel access procedure performed in the set of frequency resources; wherein is configured to transmit a first signal to the network node in the set of frequency resources according to the channel access outcome. The network node configured to transmit a transmission grant to a user device, the transmission grant indicating a set of frequency resources assigned for transmission from the user device to the network node and for performing a channel access procedure; receive a first signal from the user device in the set of frequency resources. The disclosure also relates to a non-transitory computer-readable storage medium.

13 Claims, 5 Drawing Sheets

(51) Int. Cl.
*H04W 16/14* (2009.01)
*H04W 72/04* (2009.01)
*H04W 72/12* (2009.01)
*H04B 7/0452* (2017.01)

(52) U.S. Cl.
CPC ... *H04W 74/0808* (2013.01); *H04W 74/0816* (2013.01); *H04B 7/0452* (2013.01); *H04W 72/0453* (2013.01); *H04W 72/1294* (2013.01)

(56) References Cited

U.S. PATENT DOCUMENTS

| | | | | |
|---|---|---|---|---|
| 2014/0254519 | A1* | 9/2014 | Horiuchi | H04L 5/001 370/329 |
| 2015/0085797 | A1 | 3/2015 | Ji et al. | |
| 2015/0358826 | A1* | 12/2015 | Wei | H04W 72/1268 370/329 |
| 2016/0149676 | A1* | 5/2016 | Jauh | H04W 52/242 370/329 |
| 2016/0226637 | A1* | 8/2016 | Nory | H04L 5/0053 |
| 2016/0227541 | A1* | 8/2016 | Damnjanovic | H04L 5/001 |
| 2016/0302076 | A1* | 10/2016 | Chou | H04W 52/0225 |
| 2016/0309354 | A1* | 10/2016 | Yerramalli | H04W 24/08 |
| 2016/0316374 | A1* | 10/2016 | Xu | H04W 74/0816 |
| 2016/0323915 | A1* | 11/2016 | Liu | H04W 74/0833 |
| 2016/0330630 | A1* | 11/2016 | Yoo | H04L 1/16 |
| 2016/0360550 | A1* | 12/2016 | Chen | H04L 5/1469 |
| 2017/0019882 | A1* | 1/2017 | Nimbalker | H04W 72/042 |
| 2017/0027002 | A1* | 1/2017 | Yerramalli | H04W 74/004 |
| 2018/0103458 | A1* | 4/2018 | Tooher | H04W 74/0808 |
| 2018/0124789 | A1* | 5/2018 | Yerramalli | H04L 5/0048 |
| 2018/0242317 | A1* | 8/2018 | Marinier | H04W 72/0446 |
| 2018/0254794 | A1* | 9/2018 | Lee | H04L 5/0053 |
| 2018/0288790 | A1* | 10/2018 | Kim | H04L 1/1861 |
| 2019/0098605 | A1* | 3/2019 | Seo | H04L 1/1812 |

OTHER PUBLICATIONS

"On LAA DL LBT design enabling frequency reuse", 3GPP TSG RAN WG1 Meeting #82, Beijing, P.R. China, R1-154447, 3rd Generation Partnership Project, Valbonne, France (Aug. 24-28, 2015).

"3rd Generation Partnership Project; Technical Specification Group Radio Access Network; Evolved Universal Terrestrial Radio Access (E-UTRA); Physical layer procedures (Release 13)," 3GPP TS 36.213 V13.0.1, 3rd Generation Partnership Project, Valbonne, France (Jan. 2016).

* cited by examiner

USER DEVICE, NETWORK NODE AND METHODS THEREOF

CROSS-REFERENCE TO RELATED APPLICATIONS

This application is a continuation of International Application No. PCT/EP2016/052443, filed on Feb. 5, 2016, the disclosure of which is hereby incorporated by reference in its entirety.

TECHNICAL FIELD

Embodiments of the disclosure relate to a user device and a network node for wireless communication systems. Furthermore, embodiments of the disclosure also relate to corresponding methods, a wireless communication system, a computer program, and a computer program product.

BACKGROUND

Unlicensed channel access may include a Listen Before Talk (LBT) mechanism, wherein, typically the transmitter, listens on the channel to determine whether it is free and if it may proceed with a transmission. For the Licensed Assisted Access (LAA) uplink (UL) of Long Term Evolution (LTE), the User Equipment (UE) may be allowed to transmit only if the UE firstly receives an UL grant from the E-UTRAN NodeB or evolved NodeB (eNodeB) and then successfully senses the channel as idle. Two candidate LBT mechanisms include, e.g. Category 4 LBT (LBT with random back-off with a contention window of variable size) and Category 2 LBT (LBT without random back-off), have been identified for uplink LBT. Especially Category 4 LBT is basically designed for collision avoidance, i.e. only one device accesses the channel in one time instance. However, this would result in an inefficient system, since LTE allows multiple UEs to simultaneously transmit in the UL of a subframe in a cell, either by Frequency Division Multiplexing (FDM) or by spatial multiplexing, e.g., Multiuser Multiple Input Multiple Output (MU-MIMO). This is in contrast to contemporary WiFi systems in unlicensed spectrum, which utilize wideband transmissions only, i.e., Time Division Duplex (TDM). It is therefore desirable to support an LBT mechanism for LAA enabling multiple UEs to access the channel, in order to support UE UL multiplexing by FDM and by MU-MIMO.

LTE can be deployed in unlicensed spectrum by, e.g. using a Secondary Cell (SCell) in LAA aggregated with at least one licensed carrier, where one licensed carrier is the primary cell (PCell) and at least one unlicensed carrier is configured as a SCell. For an unlicensed carrier, a regulatory requirement is that the occupied channel bandwidth shall be between 80% and 100% of the declared nominal channel bandwidth. The occupied channel bandwidth is the bandwidth containing 99% of the power of the signal. This requirement does not mandate that only a single UE can occupy 80-100% of the carrier bandwidth. For example, it would be possible to multiplex several UEs in an UL subframe over the whole carrier bandwidth using some form of interleaved FDM allocation, while fulfilling the occupied channel bandwidth requirement.

In LTE uplink, the Physical Uplink Shared Channel (PUSCH) can be allocated in single or dual clusters, where each cluster is localized and consists of a number of frequency-consecutive Physical Resource Blocks (PRBs), in order to achieve good cubic metric or PAPR performance. In order to efficiently support UE multiplexing of PUSCH, extending the current single and dual cluster allocation to allow multi-cluster (>2) allocation (e.g. PRBs/subcarriers spaced uniformly in frequency) has been identified as a candidate waveform that satisfies regulatory requirements. Therefore, it would be possible to define resource allocation methods which can be used in conjunction with an UL LBT mechanism capable of accommodating access of multiple UEs in an UL subframe.

In one conventional solution, an eNodeB performs channel assessment by measuring the received signal energy over the channel bandwidth subject to a Category 4 LBT procedure before starting transmission of data channel, e.g. Physical Downlink Shared Channel (PDSCH). This ensures fair coexistence between eNodeBs and non-LTE devices, e.g. WiFi. In order to support frequency reuse of different cells in downlink, LBT procedure coordination across different cells is proposed as: random number generators providing random backoff are similarly initialized in each cell. As random backoff or Clear Channel Assessment (CCA) counters can progress differently in each cell e.g. due to differences in the seen/measured interference, the random backoff counter will gradually diverge across the cells. To prevent such divergence, random backoff counter values need to be periodically re-initialized/re-synchronized with the same random value in all cells.

In this way the LBT procedure is coordinated to some extent as the random backoff counter values are periodically aligned, which increases the possibility that the CCA counters of different cells may reach to zero at the same time. Different cells with CCA counter reaching zero at the same time may transmit simultaneously, which supports frequency reuse in downlink.

This could be easily adapted to the uplink assuming the LBT procedure is coordinated across different UEs scheduled in the same subframe and frequency separated to support frequency domain multiplexing. Upon reception unlink grants from the eNodeB, the UEs perform LBT with a same initial CCA counter value and periodically re-initialized/re-synchronized with the same random value in all UEs.

This is disadvantageous as the support of UE multiplexing is not efficient. The CCA counter alignment across UEs does not necessarily mean the UEs are able to sense the channel as free at the same time. Different UEs may experience differences in the seen/measured interference, causing different CCA counter values in the channel assessment period. Once the CCA counter of one UE reaches zero, the transmission of that scheduled UE may block the transmissions of all other UEs.

SUMMARY

An objective of embodiments of the disclosure is to provide a solution which mitigates or solves the drawbacks and problems of conventional solutions.

Another objective of embodiments of the disclosure is to provide an LBT mechanism for unlicensed spectrum.

The above objective and further objectives are achieved by the subject matter of the independent claims. Further advantageous implementation forms of the disclosure are defined by the dependent claims.

According to a first aspect of the disclosure, the above mentioned and other objectives are achieved with a user device for a wireless communication system, the user device comprising a transceiver configured to receive a transmission grant indicating a set of frequency resources assigned for transmission to a network node;

a processor configured to determine a channel access outcome based on a channel access procedure performed in the set of frequency resources;

wherein the transceiver is configured to transmit a first signal to the network node in the set of frequency resources according to the channel access outcome.

A number of advantages are provided by a user device according to the first aspect. The present solution enables multiple user devices to access the channel and simultaneously transmit on disjoint time-frequency resources, e.g. in the uplink within a cell. Further, the user device according to the first aspect solves the problem of low efficiency of the system for the case where LBT procedure coordination is performed, which causes that the transmission of a scheduled user device may block the transmissions of all other user devices.

In a first possible implementation form of the user device according to the first aspect, the channel access procedure is performed in a subset of the set of frequency resources.

The first possible implementation form enables multiple user devices to access the set of frequency resources and simultaneously, in the cellular case, transmit on the same time-frequency resources in the uplink (MU-MIMO) within a cell. This improves the spectral efficiency over using disjoint time-frequency resources.

In a second possible implementation form of the user device according to the first implementation form of the first aspect, the transmission grant further indicates the subset of the set of frequency resources.

The second possible implementation form enables multiple user devices to perform the narrowband channel access procedure in a user device-specific subset even when multiple user devices are scheduled in the same frequency resources.

In a third possible implementation form of the user device according to the second implementation form of the first aspect, the transmission grant further indicates the size of the subset of the set of frequency resources.

It is understood that the size of the subset of the set of frequency resources may refer to a relative value in relation to the scheduled frequency resources, or an absolute value of the frequency resources, e.g. the number of resource elements or resource blocks assigned. The network node could dynamically signal a different subset size to the user device using different scheduling grants.

The third possible implementation form enables a user device to perform the (narrowband) channel access procedure in a number of different frequency resource sizes. This further allows a transparent support at the user device side between FDM and MU-MIMO, and between MU-MIMO of different number of user devices.

In a fourth possible implementation form of the user device according to the second or third implementation forms of the first aspect, the subset of the set of frequency resources or the size of the subset of the set of frequency resources is indicated by at least one of: information bits used for Demodulation Reference Signal, DMRS, cyclic shift; explicit bits of the transmission grant; Control Channel Element, CCE, or Enhanced Control Channel Element, ECCE, indices; and CCE or ECCE aggregation level.

The fourth possible implementation form causes no additional signaling overhead by reusing the DMRS cyclic shift indication, or the CCE/ECCE indices or aggregation level. The signaling capacity is enhanced by using explicit bits of the transmission grant, or the DMRS cyclic shift indication, or the CCE/ECCE indices or aggregation level, or combinations thereof.

It is understood that the subset of the set of frequency resources or the size of the subset of the set of frequency resources, or the subset of the set of frequency resources and the size of the subset of the set of frequency resources is indicated by one or combinations of DMRS cyclic shift, CCE or ECCE indices and CCE or ECCE aggregation level.

In a fifth possible implementation form of the user device according to any of the preceding implementation forms of the first aspect or to the first aspect as such, the transceiver is configured to transmit a second signal in the set of frequency resources according to the channel access outcome, wherein the transmission of the second signal precedes the transmission of the first signal.

The fifth possible implementation form is advantageous since transmitting reservation signals in frequency resources assigned for (uplink) transmissions to the network node helps the user device to reserve the channel while not causing interference to other user devices performing channel access procedure.

The function of the second signal is to claim the frequency resources or the corresponding channel. Such signals are often denoted reservation signals.

In a sixth possible implementation form of the user device according to the fifth implementation form of the first aspect, the transceiver is configured to transmit the second signal in the same frequency resources as in which the channel access procedure was performed.

The sixth possible implementation form is advantageous since there is no additional signaling overhead caused to indicate the transmission of the second signal, whilst also allowing to reserve the channel for transmissions to the network node. Further, this implementation form does not affect the other user devices performing the channel access procedure in their assigned frequency resources.

In a seventh possible implementation form of the user device according to any of the preceding implementation forms of the first aspect or to the first aspect as such, the processor is configured to determine a wideband channel access outcome based on a wideband channel access procedure, and to determine the channel access outcome based on the wideband channel access outcome and the channel access procedure performed in the set of frequency resources.

The seventh possible implementation form is advantageous in terms of improved detection reliability. The wideband channel access procedure takes into account all the energy in the entire bandwidth, which is especially helpful to detect a wideband signal, e.g. a WiFi transmission. In addition, this implementation form results in reduced complexity. The wideband channel access procedure can be typically performed with much reduced complexity without any need of baseband filtering or FFT operation.

It is understood that a wideband channel access procedure is done in a frequency resources comprising the entire transmission bandwidth of one carrier, where the entire transmission bandwidth refers to the configured transmission bandwidth, or the total frequency resource can be assigned for an uplink transmission of one carrier.

In an eight possible implementation form of the user device according to any of the preceding implementation forms of the first aspect or to the first aspect as such, the transmission of the first signal to the network node comprises at least one of: a Physical Uplink Shared Channel, PUSCH; a Physical Uplink Control Channel, PUCCH; and a Sounding Reference Signal, SRS.

The eighth possible implementation form is advantageous as the uplink transmission of PUCCH, PUSCH or SRS is according to the channel access procedure outcome, which increases the transmission possibility and enables user device multiplexing.

According to a second aspect of the disclosure, the above mentioned and other objectives are achieved with network node for a wireless communication system, the network node comprising a transceiver configured to transmit a transmission grant to a user device, the transmission grant indicating a set of frequency resources assigned for transmission from the user device to the network node and for performing a channel access procedure;

receive a first signal from the user device in the set of frequency resources.

The network node according to the second channel provides a number of advantages. The present solution enables multiple user devices to access the set of frequency resources and simultaneously transmit on disjoint time-frequency resources, e.g. in the uplink within a cell. Further, the network node according to the first aspect solves the problem of low efficiency for the case where LBT procedure coordination is performed, which causes that the transmission of a scheduled user device may block the transmissions of all other user devices in the system.

In a first possible implementation form of the network node according to the second aspect, the transmission grant indicates a subset of the set frequency resources assigned for performing the channel access procedure.

The first possible implementation form enables the network node to schedule multiple user devices to access the channel and simultaneously transmit on the same time-frequency resources, e.g. in the uplink (MU-MIMO) within a cell. This improves the spectral efficiency over using disjoint time-frequency resources. It also enables the radio network to schedule multiple user devices to perform the narrowband channel access procedure in a user device-specific subset even when multiple devices are scheduled in the same frequency resources.

In a second possible implementation form of the network node according to the first implementation form of the second aspect, the transmission grant further indicates the size of the subset of the set of frequency resources.

It is understood that the size of the subset of the set of frequency resources may refer to a relative value in relation to the scheduled frequency resources, or an absolute value of the frequency resources, e.g. the number of resource elements or resource blocks assigned. The network node could dynamically signal a different subset size to the user device using different scheduling grants.

The second possible implementation form enables a user device to perform the (narrowband) channel access procedure in a number of different sizes. This further allows a transparent support at the user device side between FDM and MU-MIMO, and between MU-MIMO of different number of user devices. This may also allow a low user device complexity structure.

In a third possible implementation form of the network node according to the second implementation form of the second aspect, the subset of the set of frequency resources or the size of the subset of the set of frequency resources is indicated by at least one of: information bits used for Demodulation Reference Signal, DMRS, cyclic shift; explicit bits of the transmission grant; Control Channel Element, CCE, or Enhanced Control Channel Element, ECCE, indices; and CCE or ECCE aggregation level.

It is understood that the subset of the set of frequency resources or the size of the subset of the set of frequency resources, or the subset of the set of frequency resources and the size of the subset of the set of frequency resources is indicated by one or combinations of DMRS cyclic shift, CCE or ECCE indices and CCE or ECCE aggregation level.

The fourth possible implementation form causes no additional signaling overhead by reusing the DMRS cyclic shift indication, or the CCE/ECCE indices or aggregation level. The signaling capacity is enhanced by using explicit bits of the transmission grant, or the DMRS cyclic shift indication, or the CCE/ECCE indices or aggregation level, or combinations thereof.

According to a third aspect of the disclosure, the above mentioned and other objectives are achieved with method for a user device, the method comprises receiving a transmission grant indicating a set of frequency resources assigned for transmission to a network node;

determining a channel access outcome based on a channel access procedure performed in the set of frequency resources;

transmitting a first signal to the network node in the set of frequency resources according to the channel access outcome.

In a first possible implementation form of the method according to the third aspect, the channel access procedure is performed in a subset of the set of frequency resources.

In a second possible implementation form of the method according to the first implementation form of the third aspect, the transmission grant further indicates the subset of the set of frequency resources.

In a third possible implementation form of the method according to the second implementation form of the third aspect, the transmission grant further indicates the size of the subset of the set of frequency resources.

In a fourth possible implementation form of the method according to the second or third implementation forms of the third aspect, the subset of the set of frequency resources or the size of the subset of the set of frequency resources is indicated by at least one of: information bits used for Demodulation Reference Signal, DMRS, cyclic shift; explicit bits of the transmission grant; Control Channel Element, CCE, or Enhanced Control Channel Element, ECCE, indices; and CCE or ECCE aggregation level.

In a fifth possible implementation form of the method according to any of the preceding implementation forms of the third aspect or to the third aspect as such, the method further comprises transmitting a second signal in the set of frequency resources according to the channel access outcome, wherein the transmission of the second signal precedes the transmission of the first signal.

In a sixth possible implementation form of the method according to the fifth implementation form of the third aspect, the method further comprises transmitting the second signal in the same frequency resources as in which the channel access procedure was performed.

In a seventh possible implementation form of the method according to any of the preceding implementation forms of the third aspect or to the third aspect as such, the method further comprises determining a wideband channel access outcome based on a wideband channel access procedure, and to determining the channel access outcome based on the wideband channel access outcome and the channel access procedure performed in the set of frequency resources.

In an eight possible implementation form of the method according to any of the preceding implementation forms of the third aspect or to the third aspect as such, the transmission of the first signal to the network node comprises at least one of: a Physical Uplink Shared Channel, PUSCH; a Physical Uplink Control Channel, PUCCH; and a Sounding Reference Signal, SRS.

According to a fourth aspect of the disclosure, the above mentioned and other objectives are achieved with a method for a network node, the method comprises transmitting a transmission grant to a user device, the transmission grant indicating a set of frequency resources assigned for transmission from the user device to the network node and for performing a channel access procedure;

receiving a first signal from the user device in the set of frequency resources.

In a first possible implementation form of the method according to the fourth aspect, the transmission grant indicates a subset of the set frequency resources assigned for performing the channel access procedure.

In a second possible implementation form of the method according to the first implementation form of the fourth aspect, the transmission grant further indicates the size of the subset of the set of frequency resources.

In a third possible implementation form of the method according to the second implementation form of the fourth aspect, the subset of the set of frequency resources or the size of the subset of the set of frequency resources is indicated by at least one of: information bits used for Demodulation Reference Signal, DMRS, cyclic shift; explicit bits of the transmission grant; Control Channel Element, CCE, or Enhanced Control Channel Element, ECCE, indices; and CCE or ECCE aggregation level.

The advantages of the methods according to the third and the fourth aspects are the same as the corresponding user device and network node according to the first and second aspects, respectively.

Embodiments of the disclosure also relates to a computer program, characterized in code means, which when run by processing means causes said processing means to execute any method according to the disclosure. Further, embodiments of the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Figure 1:
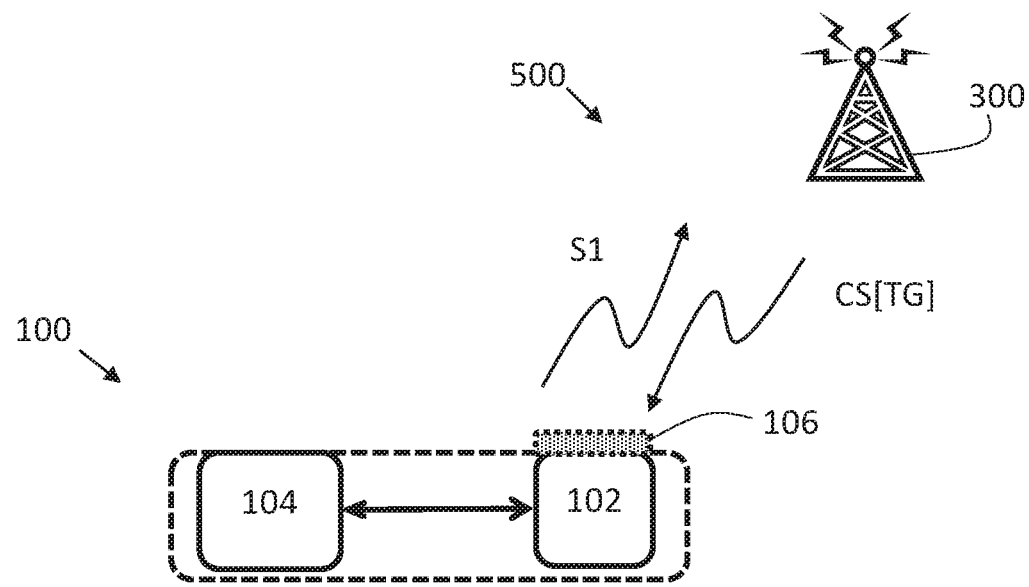
FIG. 1 shows a user device according to an embodiment of the disclosure.

FIG. 1 shows a user device 100 according to an embodiment of the disclosure. The user device 100 is configured for wireless communications in a wireless communication system 500. The user device 100 comprises a transceiver 102 communicably coupled with a processor 104 by means of suitable communication means, illustrated with the arrow in FIG. 1. The communication device 100 further comprises an optional antenna 106 coupled with the transceiver 102 configured for transmission and reception in the wireless communication system 500. According to an embodiment, the transceiver 102 is configured to receive a transmission grant TG indicating a set of frequency resources assigned for transmission to a network node 300. The transmission grant TG may be comprised in a suitable signal, such as a control signal CS illustrated in FIG. 1 and received from a network node 300 described in FIG. 3. The processor 104 is configured to determine a channel access outcome based on a channel access procedure performed in the set of frequency resources. Further, the transceiver 102 is configured to transmit a first signal S1 to the network node 300 in the set of frequency resources according to the channel access outcome.

The channel access outcome may e.g. be idle, free or busy. There should be at least two states of the channel access outcome, where one first state means that the user device 100 is allowed to start transmission to the network node 300, and one second state means that the user device 100 is not allowed to transmit to the network node 300 in the assigned frequency resources.

By transmitting a first signal S1 according to the channel access outcome it is meant that the user device 100 transmit a first signal S1 if the channel access outcome allows. This may e.g. happen if:

The channel access outcome means that the channel is free or idle according to measurements in a given time duration, e.g. a channel sensing period which could be a CCA slot, or a OFDM symbol duration.

The channel access outcome means that the channel is free or idle if a CCA counter reaches to zero.

According to the present solution the user device 100 performs a channel assess procedure so as to determine whether there is any other user device 100 transmitting in the same frequency resources. If there is no other user device 100 transmitting in the same frequency resources, it can be assumed that the channel corresponding to the frequency resources is free and therefore can be used by the present user device 100.

The channel assess procedure is performed in the same or a part of the frequency resource indicated for transmission to the network node 300, e.g. PUSCH in LTE. In one example, different uplink transmissions from different user devices are frequency separated. Therefore, the user device 100 performing channel assess procedure in its assigned time-frequency resources will ideally not sense any energy from a different user device having transmission in the same cell. Hence, the user device 100 will be able to sense the channel as idle even in case of other user devices performing transmissions. In this respect the channel access procedure is a narrowband channel access which is more explained in the following description.

The first signal S1 transmitted to the network node 300 may in a LTE context according to an embodiment comprise at least one of: a Physical Uplink Shared Channel (PUSCH); a Physical Uplink Control Channel (PUCCH); and a Sounding Reference Signal (SRS).

A user device 100 may be any of a User Equipment (UE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Figure 2:
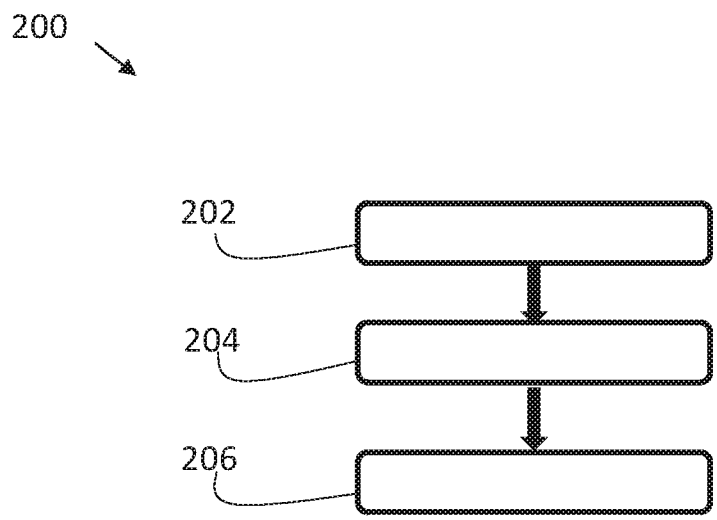
FIG. 2 shows a corresponding method according to an embodiment of the disclosure.

FIG. 2 shows a corresponding method 200 according to an embodiment of the disclosure which may be performed in a user device 100, such as the one shown in FIG. 1. The method 200 comprises receiving 202 a transmission grant indicating a set of frequency resources assigned for transmission to a network node 300. The method 200 further comprises determining 204 a channel access outcome based on a channel access procedure performed in the set of frequency resources. The method 200 further comprises transmitting 206 a first signal S1 to the network node 300 in the set of frequency resources according to the channel access outcome.

Figure 3:
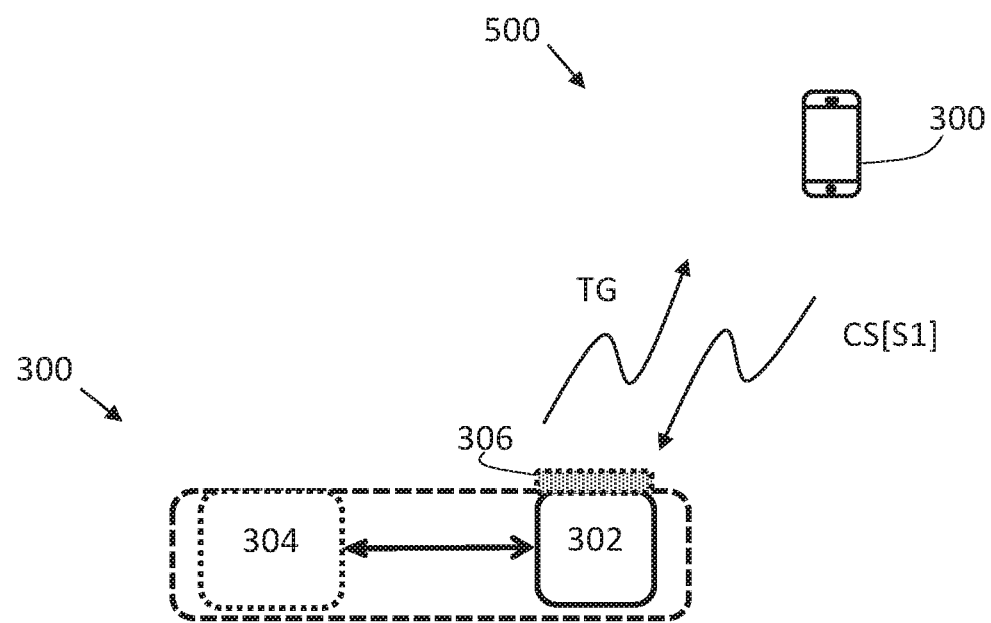
FIG. 3 shows a network node according to an embodiment of the disclosure.

FIG. 3 shows a network node 300 according to an embodiment of the disclosure. The network node 300 is configured for wireless communications in a wireless communication system 500. The network node 300 comprises a transceiver 302 communicably coupled with a processor 304 by means of suitable communication means illustrated with the arrow in FIG. 3. The network node 300 further comprises an optional antenna 306 coupled with the transceiver 302 configured to transmission and reception in the wireless communication system 500.

According to an embodiment the transceiver 302 is configured to transmit a transmission grant TG to a user device 100, e.g. the user device 100 described in FIG. 1. The transmission grant TG indicates a set of frequency resources assigned for transmission from the user device 100 to the network node 300 and also for performing a channel access procedure. In response to transmission of the transmission grant TG the network node 300 receives a first signal S1 from the user device 100 in the set of frequency resources. The transmission gran TG may be comprised suitable control signal CS as illustrated in FIG. 3.

A (radio) network node 300 or an access node or an access point or a base station, e.g., a Radio Base Station (RBS), which in some networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

Figure 4:
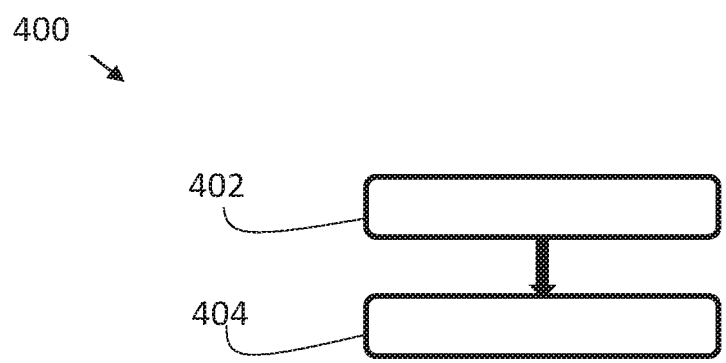
FIG. 4 shows a corresponding method according to an embodiment of the disclosure.

FIG. 4 shows a corresponding method 400 according to an embodiment of the disclosure which may be performed in a network node 300, such as the one shown in FIG. 3. The method 400 comprises transmitting 402 a transmission grant to a user device 100, the transmission grant indicating a set of frequency resources assigned for transmission from the user device 100 to the network node 300 and for performing a channel access procedure. The method 400 further comprises receiving 404 a first signal S1 from the user device 100 in the set of frequency resources.

In the following disclosure further exemplary embodiments of the disclosure is described in a LTE or LTE Advanced (LTE-A) context. Therefore, typical LTE terminology is used in these sections, such as UE which corresponds to the present user device 100 and a eNodeB which corresponds to the network node 300. Further, the expression UL and DL are used which relates to cellular wireless systems. It is however noted that the present solution is not limited to LTE or LTE-A systems and can be implemented in any suitable wireless communication system being cellular, non-cellular, or combinations thereof.

Figure 5:
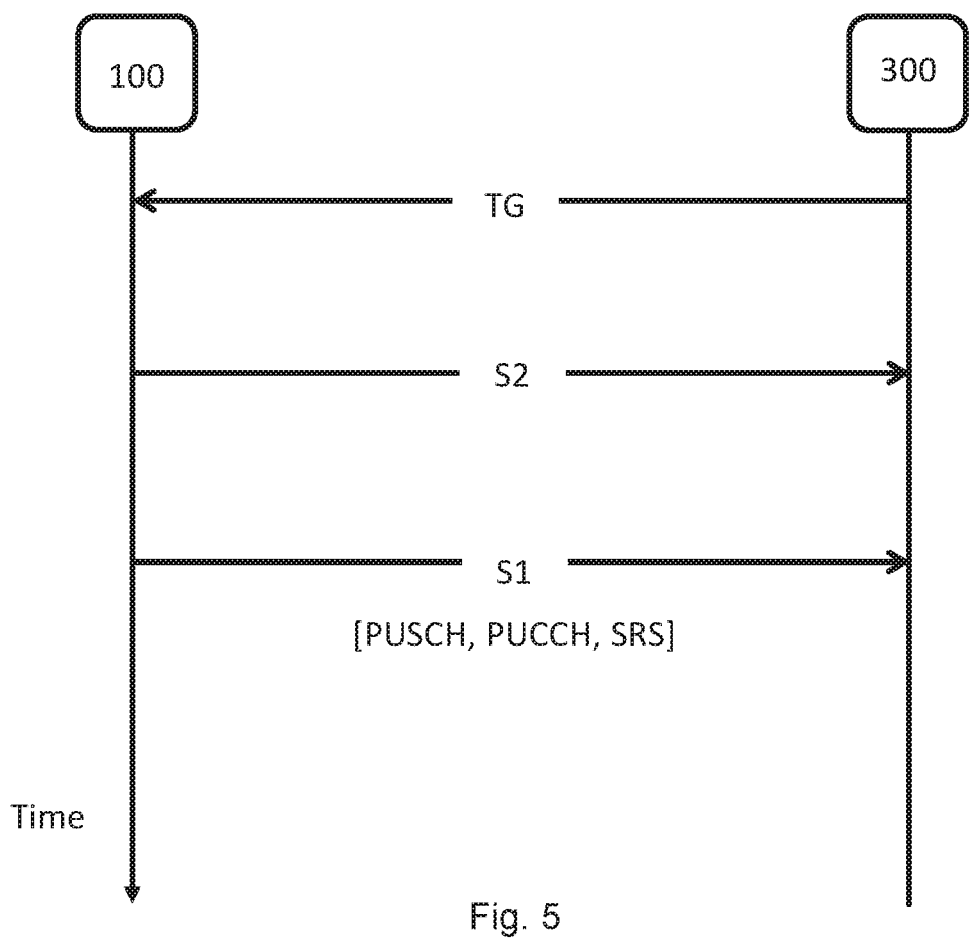
FIG. 5 shows signaling aspects according to an embodiment of the disclosure.

In one embodiment, once the channel assess procedure outcome allows the UE to transmit, the UE transmits a (uplink) second signal S2 functioning as a reservation signal to the eNodeB. This embodiment is illustrated in FIG. 5. The user device 100 receives a transmission grant TG in control signaling from the network node 300. Upon reception of the transmission grant TG the user device 100 performs a channel assess procedure and if the outcome allows the user device 100 firstly transmits a second signal S2 to the network node 300 for reserving the channel and its corresponding frequency resources. The second signal S2 may be transmitted continuously with the first signal S1. However, the signaling aspects in time are emphasized in FIG. 5. The second signal S2 is transmitted until the starting time of the uplink transmission of non-reservation signals, i.e. the first signal S1, e.g. until the uplink subframe boundary of the first signal S1. The purpose of transmitting the second signal S2 is to claim or reserve the channel while transmitting energy that would be detected by a non-LTE device performing LBT.

The second signal S2 is transmitted in the same frequency resource as in which the channel access procedure was performed according to a further embodiment. Therefore, there is no need for the eNodeB to signal the frequency resource for transmission of the second signal S2. In addition, the transmission of the second signal S2 will not affect the other narrowband sensing UE to sense the channel as free.

It is also noted from FIG. 5 that the first signal S1 can comprise any PUSCH, PUCCH, SRS, or any combinations thereof.

In a further embodiment, an LAA eNodeB transmits an uplink transmission grant to a UE, which indicates the resource allocation for the transmission to the eNodeB. Upon reception of the uplink transmission grant, the UE performs a narrowband channel assessment for determining whether there is any other user device using the same frequency resources. Specifically, the narrowband channel assessment is done in the same or a part of the frequency resources assigned for the uplink transmission. If the frequency channel access procedure outcome allows the UE to start transmission, the UE transmits, until the uplink subframe boundary, an uplink reservation signal in the same frequency resource where the UE performed the narrowband channel assessment, or in the allocated resource in the uplink transmission grant.

Figure 6:
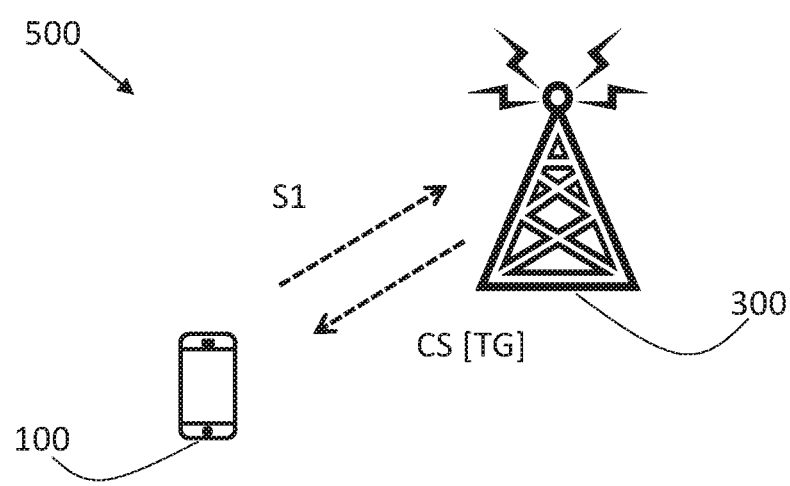
FIG. 6 shows a wireless communication system according to an embodiment of the disclosure.

FIG. 6 shows a wireless communication system 500 according to an embodiment. The wireless communication system 500 comprises at least one user device 100 and at least one network node 300 according to the present solution. It is shown in FIG. 6 how the network node 300 in this particular case transmits a transmission grant TG directly to the user device 100 in a control signal CS. The user device 100 upon reception of the transmission grant TG performs a channel access procedure according to the present solution and transmits a first signal S1 to the network node 300 if the outcome of the channel access procedure allows.

In one embodiment, the frequency resources for performing the channel access procedure may be a subset only of the total frequency resources allocated for the transmission to the eNodeB, e.g. a PUSCH transmission. This allows that orthogonal subsets of time-frequency resources could be obtained from a common set of allocated time-frequency resources. The subset could be determined by predefined rules or different form of signaling mechanisms or combinations thereof, e.g., an indication in the uplink transmission grant from the eNodeB to the UE containing information for determining which subset is selected for a narrowband channel access procedure.

Generally, a wideband channel access procedure may be seen as an energy detection channel access procedure as the wideband channel access procedure is typically performed in the time domain without FFT operations. Such wideband channel access procedure is performed in the entire transmission bandwidth. A narrowband channel access procedure is also termed as frequency channel access procedure as the narrowband channel access procedure is typically performed in the frequency domain after FFT operations.

The narrowband channel sensing may be performed in several ways. One example is that the energy is measured on the baseband signal, after down-conversion of the received RF signal, filtering and sampling. The energy may be measured from the time-domain baseband signal. A band-pass filter is applied to filter out the parts of the signal corresponding to the allocated transmission frequency resources. The energy may be measured from the frequency-domain baseband signal after the FFT operation, in the frequency domain. This is advantageous as it avoids complicated time-domain bandpass filtering.

As aforementioned, one important aspect of the present solution is that the frequency resources where a UE performs the narrowband channel access procedure is derived from the frequency resource assigned for the UE's (uplink) transmission to the eNodeB. One implementation is that the frequency resources where the UE performs the narrowband channel access procedure is the same as the frequency resources assigned for the uplink transmission. The uplink transmission could contain PUSCH. It may be also applicable to a transmission without PUSCH, e.g. PUCCH, SRS and/or DMRS. The frequency resources assigned for the uplink transmission may be indicated by the uplink transmission grant, or may be implicitly derived from a downlink assignment, e.g., a PUCCH resource.

Figure 7:
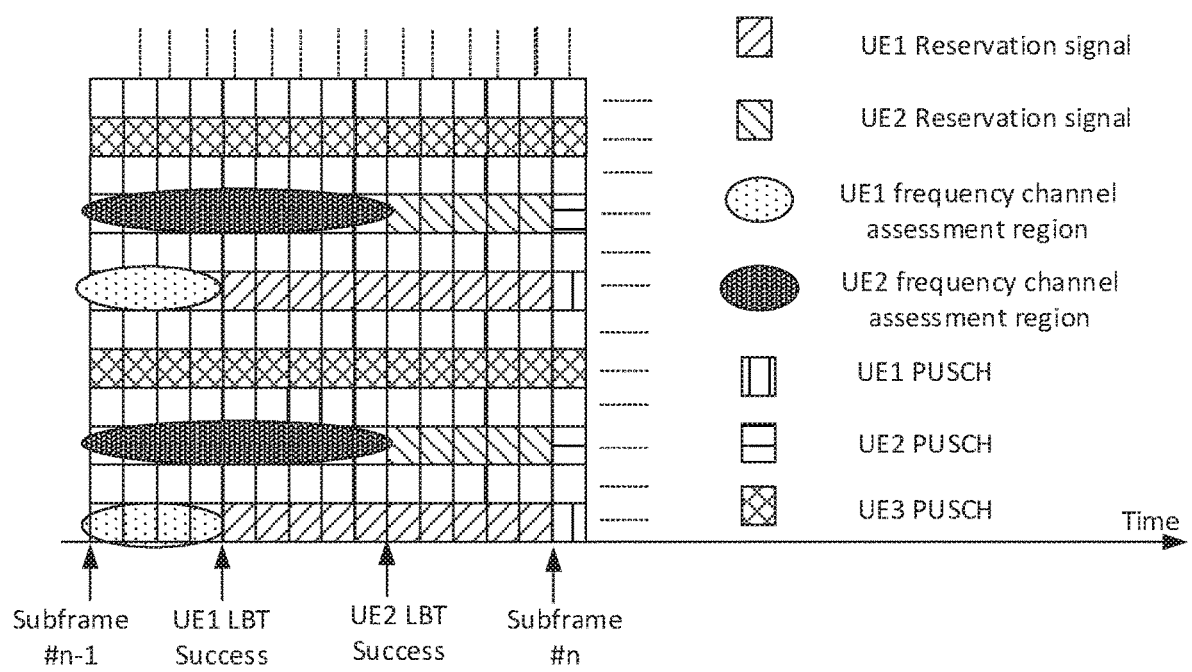
FIGS. 7 and 8 show exemplary illustrations of embodiments of the disclosure.

One example is provided in FIG. 7 where the x-axis shows time and the y-axis frequency and in which time is divided in subframes. In FIG. 7 both UE1 and UE2 receive uplink transmission grants from the eNodeB and perform channel access procedure in subframe #n−1. A multiple cluster structure is assumed for PUSCH transmission, wherein each cluster (i.e. one grid in FIG. 7) may consist of 1 resource element, 12 resource elements or any integer number of resource elements. UE1 performs the narrowband channel access procedure by comparing the received energy in a set of frequency resources with a narrow band channel access procedure threshold. The frequency resources for the narrowband channel access procedure is the same as the frequency resource for the uplink PUSCH transmission, indicated by the resource allocation field in the uplink transmission grants. As other UEs with transmission, e.g. UE3, are typically scheduled in a different frequency resource, UE1 may sense no power from other UEs in the frequency resource allocated for its own. UE1 may therefore sense the channel as idle even there is UE3 with transmission.

The method of a narrowband channel access procedure in the frequency resource assigned for uplink transmissions, e.g. PUSCH, is applicable to all possible PUSCH transmission structures, i.e. single/dual/multi-cluster DFT-S-OFDMA, comb-structure, IFDMA, or even OFDMA. The disclosed procedure is advantageous since a sensing UE is still able to sense the channel as idle even if there are transmitting UEs, because there is no energy in the frequency resource assigned for the sensing UE from any other transmitting UE. In the meantime, UE1 will sense the channel as busy in case of a WiFi device transmission, because there is energy in the frequency resource from WiFi device transmission is always wideband.

One implementation is that the frequency resources where the UE performs the narrowband channel access procedure is the same as or a part of the frequency resource assignment for the uplink transmission. One example is that a sensing UE performs the narrowband channel access procedure always in a bandwidth not greater than a given value, e.g. 6 PRBs or 25 PRBs. In case the allocated PUSCH region is not greater than 6 PRBs, the UE performs the narrowband channel access procedure in the allocated PUSCH resource. While in case the allocated PUSCH region is greater than 6 PRBs, the UEs perform the narrowband channel access procedure in allocated PUSCH resource within 6 PRBs. Predetermined rules could be used to determine the frequency resource, e.g., using the lowest/highest/central indexed PRBs of the assigned PUSCH resource. This is advantageous for reducing the complexity of a sensing UE. The UE may perform the narrowband channel assessment in a given bandwidth, e.g. at maximum 6 PRBs, even if the UE may be assigned to a bandwidth larger than 6 PRBs.

As described above, when the channel access procedure outcome allows, the UE transmits reservation signals, i.e. second signals S2, in frequency resources derived from the frequency resources assigned for the UE's uplink transmission. The reservation signal could comprise a predefined signal, a reference signal or the like. Alternatively, the reservation signal may not be defined and be up to the UE, subject to that the reservation signal fulfils existing requirements, e.g., on blocking, in-band- and out-of-band emissions.

One implementation is that the frequency resources where the UE transmits the reservation signals is the same as the frequency resource assigned for the uplink transmission. It may also be possible to transmit the reservation signal in the same or a subset of resources used for the narrowband channel measurement. One example is shown in FIG. 7, where both UE1 and UE2 receive uplink transmission grants from the eNodeB and perform channel assessment in subframe #n−1. As abovementioned, UE1 may be able to sense the channel as idle even there is UE3 with transmission. Once UE1 senses the channel as idle, UE1 starts transmission of reservation signals in the same frequency resource allocated for the uplink transmissions until the subframe boundary of subframe #n. UE2 performs the narrowband channel assessment in the frequency resource allocated for UE2's PUSCH, where there is no power from UE1's reservation signal and UE3's PUSCH.

In this embodiment, an LAA eNodeB transmits an uplink transmission grant to a UE. Upon reception of the uplink transmission grant, the UE performs a narrowband channel assessment to determine whether there is any other user device transmitting in the same frequency resource. Specifically, the narrowband channel assessment is done in a subset of the frequency resource assigned for the uplink transmission. The subsets comprise an enumeration of time-frequency resources, e.g., indices to resource blocks. It is realized that disjoint subsets could be formed when the resource allocations are the same for the users. It is further realized disjoint subsets could be formed also when the resource allocations are of different sizes or are of the same size but are partially overlapping. The selection of the subset can be indicated in the uplink transmission grant according to an embodiment. If the frequency channel assessment outcome allows the UE to start transmission, the UE transmits uplink reservation signals until the uplink subframe boundary in the same frequency resource where the UE performs the narrow channel access procedure. Accordingly, in one embodiment the frequency resource where a UE performs the narrowband channel assessment is a subset of the frequency resource assigned for the UE's uplink transmission. Once the UE senses the channel as idle, it transmits reservation signals in the same frequency resource for its narrowband channel assessment.

Figure 8:
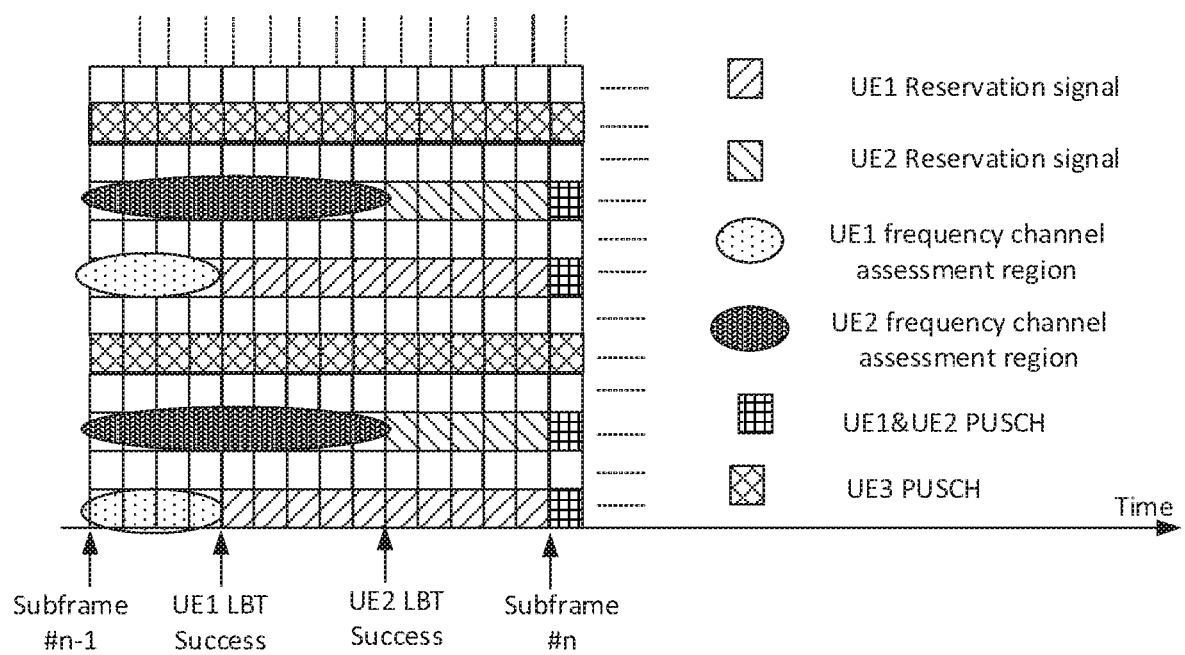

In one implementation there is an indication in the uplink transmission grant from the eNodeB to the UE on which subset is selected for the narrowband channel assessment. One such example is illustrated in FIG. 8 in which the x-axis shows time and the y-axis frequency and in which time is divided in subframes. In FIG. 8 both UE1 and UE2 receive uplink transmission grants from the eNodeB and perform channel assessment in subframe #n−1. UE1 and UE2 are multiplexed in a MU-MIMO way, i.e. the indicated PUSCH resources are the same. UE1 performs the narrowband channel access procedure to check the channel status by comparing the received energy with a narrow band channel access procedure threshold. The frequency resources for the narrowband channel access procedure is a subset of the frequency resource for the uplink PUSCH transmission, indicated in the uplink transmission grant. Once UE1 senses the channel as idle, UE1 starts transmission of reservation signals in the same frequency resource where the narrowband channel access procedure was performed until the subframe boundary of subframe #n. UE2 performs the narrowband channel access procedure in a different subset of the frequency resource allocated for UE2's PUSCH transmission, in which there is no power from UE1's reservation signal and UE3's PUSCH transmission. This is advantageous since a sensing UE is still able to sense the channel as idle even if there is a transmitting UE scheduled in the same PUSCH frequency resource, because there is no energy in the frequency resource assigned for narrowband channel access procedure from any other transmitting UE.

The time-frequency resource subset information indicated by the uplink transmission grant TG may be done e.g. by reusing the existing information field in the downlink control channel information message. One example is that the subset information is indicated by the information field in the uplink transmission grant for DMRS cyclic shift, i.e. the field "Cyclic shift for DM RS and OCC index". One way could be that one state of the field is associated with one subset. Hence, the subsets are disjoint. Different levels of subset information (i.e. different subset sizes) could be supported, e.g. one state indicating using 100% of the frequency elements in the PUSCH resource, and one other state indicating using 50% of the frequency elements in the PUSCH resource.

One specific mapping is given in Table 1, where the subset information "(x, y)" means that the PUSCH resource is divided into x subsets with index from 1 to x, and subset y is the indicated subset. Preferably the x subsets are of equal size. In the implementation up to 4 UEs can be multiplexed.

TABLE 1

Mapping of Cyclic Shift Field in UL-related DCI format to the subset information.

| Cyclic Shift Field in UL-related DCI format | The subset information |
|---|---|
| 000 | (1, 1) |
| 001 | (2, 1) |
| 010 | (2, 2) |
| 011 | (4, 1) |
| 100 | (4, 2) |
| 101 | (4, 3) |
| 110 | (4, 4) |
| 111 | Reserved |

This is advantageous as there is no additional signaling overhead caused by the indication of the subset information for the narrowband channel assessment and the transmission of reservation signals.

This refers to the subset indication in the uplink transmission grant. The design would be ideally unified and applicable to FDM only, MU-MIMO of two UEs, MU-MIMO of up to 4 UEs, and MU-MIMO of up to 8 UEs. There are several cases:

If FDM is supported, i.e. no MU-MIMO, the entire subset could be used, i.e. the subset indication has a state to indicate the entire set is used. This means a level of 100%.

If MU-MIMO of 2UEs supported, the subset indication could be for each UE, 50% resource is used. This means a level of 50%.

Further, explicit bits can also be included in the UL transmission grant to indicate the subset of the set of frequency resources for UL transmissions. Similarly, the mapping of those explicit bits to the subset could be like Table 1. Alternatively, those bits could be mapped to RRC configured subsets. The UE can determine the subset from the resources being the intersection between the PUSCH allocation and the RRC configured subset.

The subset information could be indicated implicitly by the CCE/ECCE indices of the (E)PDCCH containing the uplink transmission grant. Additionally, the CCE/ECCE aggregation level could also be used to indicate the subset information. One specific mapping is given in Table 2, where the (E)PDCCH in the UE search space is assumed. The i-th PDCCH candidate could be as specified in 3GPP TS36.213.

TABLE 2

Mapping of (E)PDCCH aggregation level and indices to the subset information.

| The aggregation level | The i-th (E)PDCCH candidate | The subset information |
|---|---|---|
| 1 | 1 | (1, 1) |
| 1 | 2 | (2, 1) |
| 1 | 3 | (2, 2) |

TABLE 2-continued

Mapping of (E)PDCCH aggregation level and indices to the subset information.

| The aggregation level | The i-th (E)PDCCH candidate | The subset information |
| --- | --- | --- |
| 1 | 4 | (4, 1) |
| 1 | 5 | (4, 2) |
| 1 | 6 | (4, 3) |
| 2 | 1 | (4, 4) |
| 2 | 2 | (8, 1) |
| 2 | 3 | (8, 2) |
| 2 | 4 | (8, 3) |
| 2 | 5 | (8, 4) |
| 2 | 6 | (8, 5) |
| 4 | 1 | (8, 6) |
| 4 | 2 | (8, 7) |
| 8 | 1 | (8, 8) |
| 8 | 2 | reserved |

In this embodiment, an LAA eNodeB transmits an uplink transmission grant to a UE, which contains the resource allocation for transmission to the LAA eNodeB. Upon reception of the uplink transmission grant, the UE performs a wideband channel assessment and potentially a narrowband channel access procedure, where the narrowband channel access procedure is performed if the wideband channel access procedure outcome results in the channel being determined as busy and is used to determine whether the interference source is from LTE or not. If the narrowband channel access procedure determines the interference source is from LTE, the UE may regard the channel as idle. Specifically, the narrowband channel access procedure is performed in the same or a subset of the frequency resource assigned for the uplink transmission. If the frequency channel access procedure outcome allows the UE to start transmission, the UE transmits, until the uplink subframe boundary, an uplink reservation signal in the same frequency resource where the UE performed the frequency channel access procedure or in the allocated resource for the transmission.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the user device 100 and the network node 300 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor of the present user device 100 and network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

According to an embodiment, a method for a network node, the method comprises transmitting a transmission grant to a user device, the transmission grant indicating a set of frequency resources assigned for transmission from the user device to the network node and for performing a channel access procedure;

receiving a first signal (S1) from the user device in the set of frequency resources.

According to another embodiment, a method for a user device, the method comprises receiving a transmission grant indicating a set of frequency resources assigned for transmission to a network node;

determining a channel access outcome based on a channel access procedure performed in the set of frequency resources;

transmitting a first signal (S1) to the network node in the set of frequency resources according to the channel access outcome.

What is claimed is:

1. A user device for a wireless communication system, the user device comprising a processor, a transceiver and a memory storing instructions for execution by the processor that causes the processor to cooperate with the transceiver to provide at least the following operations:

receive a transmission grant (TG) indicating a set of frequency resources in an unlicensed spectrum assigned for transmission to a network node, determine, based on a wideband channel access procedure, the set of frequency resources is busy, determine, based on a narrowband channel access procedure, a subset of the set of frequency resources is not busy, wherein the transmission grant indicates the subset of the set of frequency resources assigned for performing the narrowband channel access procedure and further indicates a size of the subset of the set of frequency resources, and wherein the size of the subset of the set of frequency resources is indicated by control channel element (CCE) or enhanced control channel element (ECCE) indices and CCE or ECCE aggregation level;

and transmit a reservation signal to the network node in the subset of the set of frequency resources, wherein the reservation signal reserves the subset of the set of frequency resources for transmission of one or more non-reservation signals.

2. The user device according to claim 1, wherein the transmission of the reservation signal precedes the transmission of the non-reservation signal.

3. The user device according to claim 1, wherein the transmission of the non-reservation signal to the network node comprises at least one of: a physical uplink shared channel (PUSCH); a physical uplink control channel (PUCCH); and a sounding reference signal (SRS).

4. A network node for a wireless communication system, the network node comprising a processor and a transceiver configured to:
 transmit a transmission grant to a user device,
  wherein the transmission grant indicates a set of frequency resources in an unlicensed spectrum assigned (i) for transmission from the user device to the network node and (ii) for performing a channel access procedure,
  wherein the channel access procedure is a wideband or narrowband channel access procedure, depending on a busy state of the set of frequency resources in the unlicensed spectrum,
  wherein the transmission grant indicates a subset of the set frequency resources for use in narrowband transmissions between the user device and the network node upon the user device determining the set of frequency resources is busy and further indicates a size of the subset of the set of frequency resources, and
  wherein the size of the subset of the set of frequency resources is indicated by control channel element (CCE) or enhanced control channel element (ECCE) indices and CCE or ECCE aggregation level; and
 receive a reservation signal from the user device in the subset of the set of frequency resources, wherein the reservation signal reserves only the subset of the set of frequency resources for transmission of one or more non-reservation signals from the user device and does not reserve all frequency resources in the set of frequency resources.

5. A non-transitory computer-readable storage medium storing a program code, the program code comprising instruction for at least one processor to perform a method for a user device, the method comprising:
 receiving, by the user device, a transmission grant (TG) indicating a set of frequency resources in an unlicensed spectrum assigned for transmission to a network node,
 determining, based on a wideband channel access procedure, the set of frequency resources is busy,
 determining, based on a narrowband channel access procedure, a subset of the set of frequency resources is not busy,
  wherein the transmission grant indicates the subset of the set frequency resources assigned for performing the narrowband channel access procedure and further indicates a size of the subset of the set of frequency resources, and
  wherein the size of the subset of the set of frequency resources is indicated by control channel element (CCE) or enhanced control channel element (ECCE) indices and CCE or ECCE aggregation level; and
 transmitting, by the user device, a reservation signal to the network node in the subset of the set of frequency resources wherein the reservation signal reserves the subset of the set of frequency resources for transmission of one or more non-reservation signals.

6. The non-transitory computer-readable storage medium according to claim 5, wherein the transmission of the reservation signal precedes the transmission of the non-reservation first signal.

7. The non-transitory computer-readable storage medium according to claim 5, wherein the transmission of the non-reservation signal to the network node comprises at least one of: a physical uplink shared channel (PUSCH); a physical uplink control channel (PUCCH); and a sounding reference signal (SRS).

8. The user device according to claim 1, wherein the narrowband channel access procedure determines the subset of the set of frequency resource to be idle, in response to the set of frequency resources being busy because of interference from a long term evolution (LTE) transmission.

9. The user device according to claim 8, wherein the wideband channel access procedure is performed in a time domain without fast fourier transform (FFT) operations and the narrowband channel access procedure is performed in a frequency domain after FFT operations.

10. The network node for a wireless communication system according to claim 4, wherein the narrowband channel access procedure determines the subset of the set of frequency resource to be idle, in response to the set of frequency resources being busy because of interference from a long term evolution (LTE) transmission.

11. The network node for a wireless communication system according to claim 10, wherein the wideband channel access procedure is performed in a time domain without fast fourier transform (FFT) operations and the narrowband channel access procedure is performed in a frequency domain after FFT operations.

12. The non-transitory computer-readable storage medium according to claim 5, wherein the narrowband channel access procedure determines the subset of the set of frequency resource to be idle, in response to the set of frequency resources being busy because of interference from a long term evolution (LTE) transmission.

13. The non-transitory computer-readable storage medium according to claim 12, wherein the wideband channel access procedure is performed in a time domain without fast fourier transform (FFT) operations and the narrowband channel access procedure is performed in a frequency domain after FFT operations.

* * * * *